Patented Nov. 22, 1932

1,888,785

UNITED STATES PATENT OFFICE

HENRY BERLIN, OF NEW YORK, N. Y., ASSIGNOR TO INTERNATIONAL PATENTS DEVELOPMENT COMPANY, OF WILMINGTON, DELAWARE, A CORPORATION OF DELAWARE

TREATMENT OF CORN GLUTEN

No Drawing.    Application filed July 19, 1929. Serial No. 379,563.

This invention relates to the manufacture of starch and other products from corn (maize). One of the objects of the invention is to provide a novel method for removing starch from gluten and starch mixtures such, for example, as the "gluten" which tails off from the starch tables in the wet milling process of making starch and which may contain forty per cent, more or less, of starch on a dry substance basis. This gluten and starch mixture will be referred to herein as "crude gluten" because of its incidental starch content, as referred to above. As the crude gluten comes from the gluten presses it ordinarily contains about fifty per cent of water.

Another object of the invention is to provide for effecting a separation as between the alcohol soluble substance (prolamin) in the crude gluten and the alcohol insoluble substance (glutelin) whereby these two protein products, which can be used advantageously for various purposes, may be produced in refined states, that is, each free from any substantial quantity of the other and also from non-protein substances.

Another object is the production in a convenient and economic manner of certain products, to be described, by treatment of the aforesaid protein substances.

For separating the starch from the crude gluten the following is the preferred procedure: Three parts (by weight) of crude gluten are mixed with two parts of cresol (technical—liquid) which is a mixture of ortho-, meta-, and para-cresols. The gluten cake from the press is crushed and broken up and then kneaded with the cresol to the consistency of a dough. This may be accomplished in a kneading machine of ordinary construction. Water is then added to the dough at intervals in small quantities while the dough is worked. It is very difficult, if not impossible, to wash out the starch with one portion of water. Other phenols may be used, such as carbolic acid, in place of cresol but the liquid substance referred to herein as cresol is to be preferred because of its low solubility in water. The cresol dissolves the gluten without dissolving the starch. The water removes the starch which latter can be further purified by washing with water and/or alcohol or with a very light solution of an alkali. The starch thus recovered and purified may be used for any purpose for which ordinary corn starch is used.

The residue, gluten and cresol, may be employed, without further treatment, for the manufacture of resinous plastics; or it may be subjected to further treatment for the separation of the gluten from the cresol in the form of the alcohol soluble substance prolamin, or the insoluble substance glutelin, as described in my co-pending application 617,051, filed June 13, 1932, as a division hereof.

The water used for removing the starch from the starch and gluten mixture, as described in the first separating operation, may be used repeatedly in subsequent operations of the same character performed on batches of crude gluten mixed with cresol, so as to minimize cresol losses. The cresol and alcohol can be recovered and used repeatedly.

It will be understood that considerable variation is possible in the methods of procedure employed for carrying out the invention and in the use of equivalent substances, some of which have been suggested; so that while preferred procedures and agents have been indicated, the patent is intended to cover all modifications and variations within the scope of the appended claims.

I claim:

1. Method of separating starch from corn gluten and starch mixtures which consists in adding a phenol to the mixture and washing the starch therefrom.

2. Method of separating starch from corn gluten and starch mixtures which consists in adding cresol to the mixture and washing the starch therefrom.

3. Method of separating starch from corn gluten and starch mixtures which consists in adding a phenol to the mixture to give it the consistency of a dough and washing the starch out of the material with water.

4. Method of separating starch from corn gluten and starch mixtures which consists in adding a phenol to the mixture to give it the consistency of a dough and washing the starch out of the material with water introduced a little at a time while the dough is being worked.

5. Method of separating starch from corn gluten and starch mixtures which consists in adding cresol to the mixture to give it the consistency of a dough and washing the starch out of the material with water.

6. Method of separating starch from gluten and starch mixtures which consists in adding a phenol to the mixture, washing the starch out with water, separating the starch from the water and reusing the water, with its residual phenol content, for the extraction of starch from subsequently treated mixtures.

7. Process for the treatment of gluten and residue from starch works to separate substances starch and gluten, which consists in kneading the substances with a phenol, forming with the vegetable proteins an insoluble compound.

8. Process for the treatment of gluten and residue from starch works to separate substances starch and gluten, which consists in kneading the substances with a phenol, forming with the vegetable proteins an insoluble compound.

9. Process for the treatment of gluten and residue from starch works to separate substances starch and gluten, which consists in kneading the substances with a phenol, forming with the vegetable proteins an insoluble compound, and in removing the water containing the starch.

10. Process for the treatment of gluten and residue from starch works to separate substances starch and gluten, which consists in kneading the substances with phenol, forming with the vegetable proteins an insoluble compound, and in removing the water containing the starch, and in treating the mass with an agent adapted to free the starch from the phenol.

HENRY BERLIN.